3,257,457
PRODUCTION OF FLUORO COMPOUNDS
Louis G. Anello, Basking Ridge, Henry R. Nychka, Randolph Township, Morris County, and Cyril Woolf, Morristown, N.J., assignors to Allied Chemical Corporation, New York, N.Y., a corporation of New York
No Drawing. Filed Sept. 26, 1962, Ser. No. 226,439
9 Claims. (Cl. 260—593)

This invention relates to processes for making hexafluoroacetone, and perchlorofluoroacetones particularly pentafluoromonochloroacetone. These products, of known composition and utility, comprise $C_3OCl_{6-x}F_x$ where $x$ is an integer from 1 to 6 inclusive, and mixtures thereof.

Processes for making the indicated compounds are known. It has been proposed to make hexafluoroacetone by reaction of acetone and elemental fluorine. Disadvantages entailed in use of hazardous elemental fluorine are obvious. Liquid-phase fluorination reactions, involving use of anhydrous HF and pentavalent antimony fluorochloride, to make perchlorofluoroacetones are known. While such reactions are commercially successful, liquid-phase processes utilizing antimony halides are characterized by recognized disadvantages among which are the corrosiveness of antimony halides, difficulties arising out of the use of liquid-phase reactions as distinguished from a solid catalyst process, and relatively high antimony halides volatility causing gas-line plugging. Completely gas-phase, solid catalyst processes for preparing perchlorofluoroacetones are known. While such processes are notably efficient with regard to synthesis of perchlorofluoroacetones containing 4 or less fluorine atoms per mol, these solid catalyst procedures afford no appreciable production of the higher fluorine compounds, i.e.

$$CF_3COCF_2Cl$$

and $CF_3COCF_3$.

A major object of this invention lies in provision of solid catalyst, all gas-phase processes for making the perfluoro and all of the perchlorofluoroacetones by procedure not requiring use of elemental fluorine. A further particular objective is to provide non-elemental fluorine, all gas-phase catalytic processes for making $CF_3COCF_3$ in high yields.

In accordance with the invention it has been found that substantially anhydrous dichromium trioxide, $Cr_2O_3$, catalyzes anhydrous HF fluorination of perchloro or perchlorofluoroacetone starting materials to form perchlorofluoro or perfluoroacetones having higher fluorine content than the starting material subjected to fluorination. The invention involves the discovery that dichromium trioxide possesses the properties of not only effectively promoting gas-phase HF fluorination of hereindescribed acetone starting materials to perchlorofluoroacetone products containing increased although relatively low fluorine content, but also of promoting gas-phase fluorination of such starting materials to the high fluorine compounds, and yet more remarkably to perfluorination to produce high yield of $CF_3COCF_3$. Further, we find that $Cr_2O_3$ may be caused to function selectively with regard to formation of dominant amounts of $CF_3COCF_2Cl$ or $CF_3COCF_3$, whichever may be the more desired product. The invention also includes the discovery of reaction conditions which regulate selectivity of the catalyst and which, conjunctively with the catalyst, accomplish the stated objectives.

As to starting materials used in practice of the invention, it is important that such materials contain no hydrogen. Presence of hydrogen in a starting material not only results in production of substantially none of the herein sought-for products but also causes vigorous starting material decomposition with formation of numerous unwanted compounds such as phosgene, carbon monoxide, halogenated methane derivatives, and resinous tars. Thus, starting materials employed herein contain no hydrogen, and are referred to as perhalogenated acetones.

In the broader aspects of the invention, the starting materials comprise perhalogenated acetones containing zero to not more than 5 fluorine atoms and wherein all halogens are selected from the group consisting of chlorine and fluorine. In preferred embodiments, i.e. those directed primarily to manufacture of $CF_3COCF_3$ and $$CF_3COCF_2Cl$$

the preferred starting materials comprise perhalogenated acetones containing zero to not more than 4 fluorine atoms and wherein all halogens are of the group consisting of chlorine and fluorine. Aside from perchlorofluoroacetones which may, for example, constitute recycled feed stock, the commercially important source most adaptable for use as starting material is hexachloroacetone, $$CCl_3COCCl_3$$

a liquid under normal conditions having a boiling range of about 202–204° C. Hence, suitable starting materials include hexachloroacetone and Monofluoropentachloroacetone ($CFCl_2COCCl_3$), B.P. 163–166° C.
Sym-difluorotetrachloroacetone ($CFCl_2COCFCl_2$), B.P. 118–122° C.
Asym-difluorotetrachloroacetone ($CF_2ClCOCCl_3$), B.P. about 120° C.
Trifluorotrichloroacetone ($CCl_2FCOCClF_2$), B.P. about 84° C.
Asym-trifluorotrichloroacetone ($CF_3COCCl_3$), B.P. about 84° C.
Sym-tetrafluorodichloroacetone ($CClF_2COCClF_2$), B.P. about 44° C.
Asym-tetrafluorodichloroacetone ($CF_3COCCl_2F$), B.P. about 44° C.
Pentafluoromonochloroacetone ($CF_3COCClF_2$), B.P. 7–11° C.

and any mixtures of two or more of any of the foregoing. In practice of the better embodiments, it is usually preferred to feed to the reaction a mixture of unreacted or underfluorinated recycle and incoming $CCl_3COCCl_3$, e.g. mixtures containing 35–65 weight percent of $$CCl_3COCCl_3$$

balance, recycle stock. Fluorination up to and including about three fluorine atoms appears to be at least locally exothermic, and limitation of $CCl_3COCCl_3$ feed per pass facilitates easier temperature control.

It will be understood that if a compound such as monofluoropentachloroacetone is utilized as starting material, practice of the invention results in a product which contains at least two atoms of fluorine and may contain more. Similarly, if the starting material is a tetrafluorodichloroacetone, the product obtained therefrom contains more fluorine and may be pentafluoromonochloroacetone. Further, in a situation where $CF_3COCF_3$ is the principally sought-for end product, it is possible to use as starting material the perchloroacetone, or any of the perchlorofluoroacetones containing from one up to 5 fluorine atoms.

The catalysts employed in practice of the invention are anhydrous dichromium trioxides ($Cr_2O_3$) containing substantially no water of hydration. In accordance with the broader aspects of the invention with regard to the catalysts utilized, the dichromium trioxides may be obtained from any source, and may be made by any suitable known procedure. However, the better catalysts are those made by certain heat treatment of hydrous chromic oxides which in turn are derived as precipitates from aqueous solutions of trivalent chromium salts such as chromium nitrate, chloride, and sulfate. While precipitation of hydrous chromic oxides may be effected by means of addition to the chromic salt solutions of bases such as NaOH and KOH, the preferred catalysts are those derived from hydrous chromic oxides precipitated out of an aqueous solution of a trivalent chromium salt by means of ammonia used e.g. as ammonia gas or as $NH_4OH$. A satisfactory method for making such a hydrous oxide includes adding an aqueous solution of ammonia to a heated aqueous solution of a trivalent chromium salt, preferably the nitrate, $Cr(NO_3)_3 \cdot 9H_2O$, until the aqueous solution is approximately neutral, about pH 7. The resulting solution may be boiled for a few minutes and filtered while hot to facilitate filtration. The hydrous chromic oxide precipitate recovered on filtration may be hot water-washed to leach out ammonium nitrate and any other water-soluble impurities. Hydrous $Cr_2O_3$ thus obtained may be then converted to the $Cr_2O_3$ catalysts of the invention by heat treatment at elevated temperatures not higher than about 400° C. Preliminary drying may be effected in any suitable way such as by heating under vacuum or in an inert gas stream, or by heating in any equipment provided with facilities for steam escape. In one of the better embodiments of catalyst preparation, the hydrous chromic oxide is dried at temperatures of about 100–200° C. to remove the major portion of combined water, and the partially dehydrated oxide is then granulated to about 4 to 20 mesh, or pressed to pellets e.g. ⅛″ diameter and ⅜″ long. The sized material is then subjected to heat treatment for a substantial period of time at temperature in the range of about 300–400° C.

In all embodiments of the invention in which the catalyst employed has been made by precipitation from an aqueous solution of a trivalent chromium salt, and particularly when ammonia precipitated, it is preferred to subject the chromic oxide material to heat treatment, in a suitable vented heating chamber, i.e. in an atmosphere consisting of water vapor and possibly an inert gas, at temperature in the range of substantially 300–400° C. for at least about one hour preferably for at least two hours and for a period in the range of about two to four hours and until after the exit of the heat treater contains no water. The heat treatment noted, in addition to accomplishing an unusually thorough degree of dehydration, imparts to the catalytic material the properties to which are attributable the unique catalytic activities which effect fluorination to the perfluoro $CF_3COCF_3$.

Although not preferred, the dichromium trioxide catalysts may be used in supported form, i.e. supported on inert refractory material such as silica, fused alumina (Alundum) chips, or calcium or magnesium fluoride. Catalyst in supported form may be prepared by soaking fused alumina 4–8 mesh chips in a saturated solution of chromic nitrate, filtering, drying, and heat-treating at 300–400° C., as above. Alternatively, supported catalyst may be made by coprecipitating chromic hydroxide and a refractory material such as calcium or magnesium fluoride and, after filtering subjecting the same to drying and heat treatment as above. In the making of supported catalysts, which consist of $Cr_2O_3$ plus a support, proportioning of reactants may be such that the catalytic materials contain 1–60%, preferably 2–45% by weight of $Cr_2O_3$.

The catalytically active materials employed consist of the described anhydrous dichromium trioxides which may be carried by an inert support. Preferably the catalysts are used in unsupport but sized form, i.e. in granular or pelleted form. The preferred catalysts are characterized by having been formed from hydrous chromic oxides derived by ammonia precipitation from a trivalent chromium salt solution, preferably the nitrate, and subsequent subjection to the 300–400° C. heat treatment described. Such catalysts are substantially amorphous, and have a crystallite size, as determined by X-ray diffraction. A further characteristic of the ammonia precipitated-heat treated unsupported $Cr_2O_3$ catalysts of the invention is relatively high surface area. Generally, the surface area is at least 5 m.²/g. and usually is greater than 50 m.²/g. The method for determining surface area was the standard nitrogen adsorption method as described by Emmett and Brunauer, Journal American Chemical Society, vol. 56, 35 (1934), and method of calculation was that of Harkins and Jura, Journal American Chemical Society, vol. 66, 1366 (1944).

Any suitable chamber or reactor tube equipped for metered introduction of reactants and constructed of inert material may be employed for carrying out the reaction provided the reaction zone is of sufficient length and cross-sectional area to accommodate the required amount of catalyst necessary to provide adequate gas contact area and at the same time afford sufficient free space for passage of the gas mixture at an economical rate of flow. Materials such as nickel, graphite, Inconel and other materials resistant to HF may be suitable for reactor tubes. Externally disposed reactor tube heating means such as electrical resistance heaters may be used for heating purposes.

Generally, the process of the invention is carried out by contacting vapor phase starting compound with the catalyst at temperature at which fluorination takes place in the presence of gaseous HF. Operations may be suitably carried out by introducing a gaseous mixture of reactants into a reaction zone containing the catalyst and heating said mixture in the zone at indicated temperatures for a time sufficient to convert an appreciable amount of the organic halogenated compound to higher fluorinated compound, withdrawing gaseous products from the zone and recovering said fluorinated material from the gaseous products. Atmospheric pressure operation is preferred but the reaction may, if desired, be carried out at superatmospheric or subatmospheric pressure.

Reaction temperatures are maintained at or above the level at which fluorination of the particular starting compound begins to take place in the presence of gaseous HF and the solid $Cr_2O_3$. Some fluorination may be noted at temperature as low as about 250° C. However, reaction proceeds at a more satisfactory rate and fluorination will generally be more complete at temperatures upwardly of about 265° C. Fluorination proceeds and formation of products may be effected at temperature as high as about 550° C., although to guard against decomposition of starting material and products, temperatures higher than about 450° C. are not particularly desirable. Temperature variations within the general range of 265–45° C. regulate the relative amounts of products formed, and hence such temperatures are adjusted in accordance with whatever dominant product is desired. In the preferred embodiments, i.e. those directed to maximum production of $CF_3COCF_3$ and substantial but lesser formation of $CF_3COCF_2Cl$, particularly when using the preferred catalyst, preferred temperatures are substantially in the range of 330–380° C. In circumstances where maximum production of $CF_3COCF_2Cl$ and substantial but lesser formation of $CF_3COCF_3$ is desired, particularly when using the preferred catalyst, preferred temperatures are substantially in the range of 265–330° C.

Molar ratio of HF to starting material (i.e. total organics charged) depends to a considerable extent on the amount of fluorine if any contained in the starting material, and the amount of fluorine desired in the sought-for product. Generally, if a higher fluorinated product is desired, and the starting material contains no fluorine or only a small proportion and contains a relatively large number of chlorine atoms to be substituted, corresponding large amounts of HF are ordinarily introduced into the reactor with the starting material. One mol of HF for each atom of chlorine to be substituted is the theoretical amount. From advantageous operational viewpoint, it is highly desirable to maintain mol ratio of HF to total organic starting material sufficiently low so that a high percentage utilization of fluorine will be obtained thereby simplifying the potentially difficult problem of recovering HF from the product mixture, since recycling of unreacted starting material is more practicable than recovery of unreacted HF. While amounts of HF as much as 150% in excess of theory can be used, but to no particular advantage, in general, amounts of HF more than about 100% in excess of theory are not preferred, i.e. theory on the basis of total organics charged and total fluorination to $CF_3COCF_3$. In practice of the more preferred embodiments and particularly when operating with the preferred catalyst, it is preferred to utilize HF in amount in the range of 30% of theory to 75% in excess of theory.

Contact time of reactants with catalyst may range considerably. In general, low contact time tends toward formation of lower fluorine content products, and higher contact time toward the high fluorine compounds. Contact time may vary from one to 60 or more seconds. Particularly when working in the 265–380° C. temperature range, and especially when using the preferred catalyst, contact time ordinarily is not less than about 6 seconds, and preferably in the range of 6–25 seconds. In a particular operation, the rate of flow of reactants in the reaction zone is dependent upon variables such as scale of operation, quantity of catalyst in the reactor, organic starting material used, temperature, product made, and specific apparatus employed. For a given operation, dependent upon the foregoing variables and particularly on the product desired, optimum conditions as to temperature, quantity of HF, and contact time may be best determined by test runs.

Products which may be made in accordance with the invention include the eight above identified perchlorofluoroacetones and hexafluoroacetone, $CF_3COCF_3$, B.P. about minus 26° C. Product recovery may be conventional as known in this art. Sought-for product may be recovered in any adequate manner as by removal of HF and HCl from the reaction zone exit as by suitable gas scrubbing with NaF, followed by condensation of organics and subsequent fractional distillation. The identity and amount of product in the reactor exit gas stream may be determined by fractional distillation and/or conventional infrared analytical technique. The gaseous product may be condensed in a vessel maintained at a temperature substantially below the boiling point of the lowest boiling material present, e.g. by indirect cooling of the gas in a bath of acetone and carbon dioxide ice. The particular products recovered depend, as indicated above, upon starting material and reaction conditions such as temperature, molar ratio of the reactants, etc. Substantially pure product may be recovered by distillation of condensates obtained above, and unreacted halogenated compound starting material recycled to subsequent operation.

The following examples illustrate practice of the invention. In Examples 1–4, mol percent yields are on the basis of starting material consumed, i.e. mols of product divided by mols of starting material consumed multiplied by 100. The dichromium trioxide catalyst employed in the runs of Examples 1–4 was prepared by adding about 530 g. of commercial grade high purity $$Cr(NO_3)_3 \cdot 9H_2O$$

and 500 g. of 28% aqueous $NH_4OH$ with stirring to 2000 mol of water heated to about 90° C. The resulting precipitated hydrous chromic oxide was filtered, water-washed, preliminarily dried by heating to about 125° C., and pelleted to about 6–10 mesh pellets. These pellets (about 300 cc.) were charged into a 1″ I.D. by 36″ long nickel reactor mounted in an electrically heated furnace equipped with means for maintaining in the reactor the temperatures stated. The inlet end of the reactor was provided with facilities for metered introduction of vaporous reactants, and the outlet end of the reactor was connected to the inlet end of a product recovery system. For completion of preparation of the catalyst, prior to use of the same in the following runs, the pellets in the reactor were subjected to suitably vented heat treatment at temperature in the range of 370–400° C. for about 4 hrs. and until after the heater exit contained no water, to bring about completion of dehydration and to effectuate the property changes to which the high activity of the $Cr_2O_3$ catalyst is attributable.

*Example 1.*—Subsequent to production of the catalyst, temperature in the reactor was adjusted to about 350–355° C. and was so maintained throughout the present run. During a period of about 3.5 hrs., about 632 g. (3.17 m.) of vaporous $CF_2ClCOCF_2Cl$ and about 80 g. (4.0 m.) of anhydrous HF were simultaneously metered into the reactor and thru the catalyst bed. HF:organic mol ratio was about 1.3:1. Charging of the organics and HF was such that contact time in the reactor was about 15 seconds. The reactor effluent was passed thru a gas scrubber filled with pelleted NaF which removed unreacted HC and HCl from the gas stream. The exit of the scrubber was totally condensed in a Dry Ice-acetone trap, and about 518 g. of organic material were collected in the trap. The condensate was fractionally distilled, and molecular composition of the organic products recovered was about as follows:

| Fraction | Grams | Mols | Mol Percent Yield | B.P.,° C.[1] |
|---|---|---|---|---|
| Hexafluoroacetone | 282 | 1.70 | 63 | −25 |
| Pentafluorochloroacetone | 104 | 0.57 | 21 | +8 |
| Tetrafluorodichloroacetone | 92 | 0.47 | | 44 |

[1] Approximate.

*Example 2.*—Catalyst and apparatus were the same as in Example 1. In a run of about 6.5 hrs., about 672 g. (2.5 m.) of vaporous $CCl_3COCCl_3$ and about 420 g. (21.0 m.) of anhydrous HF were metered into the reactor. Temperature was maintained at about 360–370° C., and HF:organic mol ratio was about 8.4:1. Contact time was about 15 seconds. A total of about 12.8 mols of HCl was liberated. The reactor exit was NaF-scrubbed, condensed, and the 290 g. of cold trap condensate was fractionated as before. Molecular composition of the organic products recovered was about as follows:

| Fraction | Grams | Mols | Mol Percent Yield | B.P.,° C.[1] |
|---|---|---|---|---|
| Hexafluoroacetone | 195 | 1.18 | 47 | −25 |
| Pentafluorochloroacetone | 55 | 0.30 | 12 | +5.5 |
| Tetrafluorodichloroacetone | 21 | 0.11 | 4 | 44 |
| Trifluorotrichloroacetone | 10 | 0.05 | 2 | 80+ |

[1] Approximate.

A composite of the hexafluoroacetone fractions of the foregoing and other similar runs was carefully distilled and there was recovered a fraction of minus 26° C., B.P., the known boiling point of $CF_3COCF_3$. M.W. was found to be 166–169 compared to 166 of theory. The infrared curve of the hexafluoroacetone fraction matched the known pattern. A composite of the pentafluorochloroacetone fraction of the foregoing and other similar runs was carefully distilled, and there was recovered a fraction boiling at 7.5–8.5° C. Fluorine content was 50.5% (theory 52.0). The infrared curve showed the same characteristic absorption peaks as curves of known pentafluorochloroacetone, and also a very strong carbonyl function. Chlorinolysis of this material also established the $CF_3COCF_2Cl$ structure since the only organic products were $CF_3COCl$ and $CF_2Cl_2$ obtained in high yield.

*Example 3.*—Catalyst and apparatus were the same as in Example 1. Temperature in the reactor was held at about 275° C. throughout the run. In the course of about 3.3 hrs., about 1370 g. (6.87 m.) of vaporous $CF_2ClCOCF_2Cl$ and about 128 g. (6.4 m.) of anhydrous HF were charged. HF:organic mol ratio was about 0.9:1, and contact time was about 8 seconds. The reactor exit was NaF scrubbed, then totally condensed in a Dry Ice-acetone trap, and about 1341 g. of organic material were collected in the trap. On fractional distillation, molecular composition of the organic products recovered was about as follows:

| Fraction | Grams | Mols | Mol Percent Yield | B.P.,° C.[1] |
|---|---|---|---|---|
| Hexafluoroacetone | 143 | 86 | 23 | −25 |
| Pentafluorochloroacetone | 476 | 2.61 | 69 | +5−6 |
| Tetrafluorodichloroacetone | 697 | 3.5 | | |

[1] Approximate.

Comparison of the above results, illustrating high dominance of $CF_3COCF_2Cl$ with respect to $CF_3COCF_3$, with the results of Examples 1 and 2, showing high dominance of $CF_3COCF_3$ with respect to $CF_3COCF_2Cl$, demonstrates influence of temperature and catalyst selectivity which in turn affords process flexibility regarding dominant production of one or the other of $CF_3COCF_2Cl$ and $CF_3COCF_3$.

Example 4.—In this run and in those of the following Examples 5 and 6, the organic starting material was approximately a 50–50 weight mixture of $CCl_3COCCl_3$ and $CF_2ClCOCF_2Cl$, purpose being to charge to the reactor a typical feed made up of recycled $CF_2ClCOCF_2Cl$ and incoming hexachloroacetone. In the present run, the catalyst employed was the same as above. In the course of about 3.5 hrs., an organic feed mixture consisting of about 330 g. (1.24 m.) of vaporous $CCl_3COCCl_3$ and 257 g. (1.29 m.) of vaporous $CF_2ClCOCF_2Cl$, and about 139 g. (6.95 m.) of anhydrous HF were charged into the reactor. Mol ratio of HF to total organics was about 2.7:1.0. Temperature was maintained at about 300° C., and contact time was about 12 seconds. A total of about 3.5 mols of HCl were liberated. The reactor exit was NaF-scrubbed, condensed, and the 426 g. of cold trap condensate was fractionated as before, molecular composition of the products recovered being as follows:

| Fraction | Grams | Mols | Mol Percent Yield | B.P.,° C.[1] |
|---|---|---|---|---|
| Hexafluoroacetone | 76 | 0.46 | 24 | −25 |
| Pentafluorochloroacetone | 84 | 0.46 | 24 | +7−8 |
| Tetrafluorodichloroacetone | 122 | 0.61 | | 44 |
| Trifluorotrichloroacetone | 80 | 0.37 | 19 | 84 |
| Difluorotetrachloroacetone | 42 | 0.18 | 9 | 122 |

[1] Approximate.

Example 5.—The catalyst employed in the present run and in that of Example 6 was made from high purity commercial-grade $Cr_2O_3$. This material was dampened with water, pressed into cakes, the cakes broken up to about 4–10 mesh granules which were dried to substantially completely dehydrated condition by adequate heating, and charged (240 cc.) into the reactor. During about 5 hrs., an organic feed mixture consisting of about 238 g. (0.9 m.) of vaporous $CCl_3COCCl_3$ and about 238 g. (1.2 m.) of vaporous $CF_2ClCOCF_2Cl$ and about 132 g. (6.6 m.) of anhydrous HF were passed thru the catalyst bed. Mol ratio of HF to total organics charged was about 3.1:1, temperature was maintained at about 400° C., and contact time was about 5 seconds. The reactor exit was handled as in Example 1, and fractional distillation of the about 363 g. of organic material collected in the trap resulted in organic products recovery as follows:

| Fraction | Grams | Mols | Mol Percent Yield | B.P.,° C.[1] |
|---|---|---|---|---|
| Hexafluoroacetone | 7 | 0.04 | 4 | −25 |
| Pentafluorochloroacetone | 43 | 0.24 | 22 | +6−8 |
| Tetrafluorodichloroacetone | 200 | 1.00 | | 44 |
| Trifluorotrichloroacetone | 83 | .38 | 35 | 84 |

[1] Approximate.

Example 6.—In a period of about 6¼ hrs., an organic feed mixture consisting of about 355 g. (1.40 m.) of vaporous $CCl_3COCCl_3$ and about 280 g. (1.40 m.) of vaporous $CF_2ClCOCF_2Cl$ and about 344 g. (17.1 m.) of anhydrous HF were passed thru the catalyst bed. Mol ratio of HF to total organics charged was about 6.1:1, temperature was maintained at about 400° C., and contact time was about 4 seconds. The reactor exit was handled as in Example 1, and fractional distillation of the about 355 g. of organic material collected in the trap resulted in organic products recovery as follows:

| Fraction | Grams | Mols | Mol Percent Yield | B.P.,° C.[1] |
|---|---|---|---|---|
| Hexafluoroacetone | 24.5 | 0.15 | 7 | −25 |
| Pentafluorochloroacetone | 185.8 | 1.02 | 47 | +7−9 |
| Tetrafluorodichloroacetone | 125.6 | 0.63 | | 44 |
| Trifluorotrichloroacetone | 17.2 | 0.08 | 4 | 84 |

[1] Approximate.

Examples 5 and 6 illustrate results of relatively high temperature and short contact time, and production of $CF_3COCF_2Cl$ with minimized formation of $CF_3COCF_3$.

We claim:

1. The process for making perhaloacetone $C_3OCl_{6-x}F_x$ where $x$ is an integer from 1 to 6 which process comprises subjecting vaporous starting material—said starting material comprising perhalogenated acetone containing zero to not more than 5 fluorine atoms and wherein all halogens are selected from the group consisting of chlorine and fluorine—in a reaction zone to the action of substantially anhydrous HF, while in the presence of a catalyst consisting of dichromium trioxide, at temperature substantially in the range of 250–550° C. to effect fluorination of starting material and formation of $C_3OCl_{6-x}F_x$ product having a fluorine content greater than that of said starting material and where $x$ is an integer from 1 to 6.

2. The process of claim 1 in which the organic starting material contains not more than 4 fluorine atoms and the product is $C_3OCl_{6-x}F_x$ where $x$ is an integer from 5 to 6.

3. The process for making perhaloacetone $C_3OCl_{6-x}F_x$ where $x$ is an integer from 1 to 6 which process comprises subjecting vaporous starting material—said starting material comprising perhalogenated acetone containing zero to not more than 5 fluorine atoms and wherein all halogens are selected from the group consisting of chlorine and fluorine —in a reaction zone to the action of substantially anhydrous HF, while in the presence of a catalyst consisting of dichromium trioxide, at temperature substantially in the range of 250–550° C. to effect fluorination of starting material and formation of $C_3OCl_{6-x}F_x$ product having a fluorine content greater than that of said starting material and where x is an integer from 1 to 6; said catalyst having been derived from hydrous chromic oxide formed by precipitation from a trivalent chromic salt solution and subjected to heat treatment substantially in the range of 300–400° C. for not less than about one hour.

4. The process for making perhaloacetone $C_3OCl_{6-x}F_x$ where $x$ is an integer from 1 to 6 which process comprises subjecting vaporous starting material—said starting material comprising perhalogenated acetone containing zero to not more than 5 fluorine atoms and wherein all halogens are selected from the group consisting of chlorine and fluorine—in a reaction zone to the action of substantially anhydrous HF, while in the presence of a catalyst consisting of dichromium trioxide, at temperature substantially in the range of about 250–550° C. to effect fluorination of starting material and formation of $C_3OCl_{6-x}F_x$ product having a fluorine content greater than that of said starting material and where $x$ is an integer from 1 to 6; said catalyst having been derived from hydrous chromic oxide formed by ammonia precipitation from a trivalent chromium salt solution and subjected to heat treatment substantially in the range of 300–400° C. for not less than about two hours.

5. The process for making perhaloacetone $C_3OCl_{6-x}F_x$ where $x$ is an integer from 5 to 6 which process comprises subjecting vaporous starting material—said starting material comprising perhalogenated acetone containing zero to not more than 4 fluorine atoms and wherein all halogens are selected from the group consisting of chlorine and fluorine —in reaction zone to the action of substantially anhydrous HF, while in the presence of a catalyst consisting of dichromium trioxide, at temperature substantially in the range of 250–450° C. to effect fluorination of starting material and formation of $C_3OCl_{6-x}F_x$ product having a fluorine content greater than that of said starting material and where $x$ is an integer from 5 to 6; said catalyst having been derived from hydrous chromic oxide formed by ammonia precipitation from a trivalent chromium salt solution and subject to heat treatment substantially in the range of 300–400° C. for not less than about two hours.

6. The process of claim 5 in which HF is charged in amount not substantially more than 100% in excess of theory.

7. The process of claim 5 in which fluorination temperature is substantially in the range of 265–330° C., and the $C_3OCl_{6-x}F_x$ reaction product contains $CF_3COCF_2Cl$ and a substantial amount of $CF_3COCF_3$.

8. The process for making a reaction product containing $CF_3COCF_2Cl$ and a greater mol proportion of $CF_3COCF_3$ which process comprises introducing a substantially anhydrous gas-phase mixture of HF and a starting material—said starting material comprising perhalogenated acetone containing zero to not more than 4 fluorine atoms and wherein all halogens are selected from the group consisting of chlorine and fluorine—into a reaction zone containing a catalyst consisting of dichromium trioxide, said HF being charged in amount substantially in the range of 30% of theory to 75% in excess of theory, heating said mixture in said zone in contact with said catalyst to fluorination temperature substantially in the range of 330–380° C. to thereby effect fluorination of starting material and formation of a reaction product containing $CF_3COCF_2Cl$ and a greater mol proportion of $CF_3COCF_3$; said catalyst having been derived from hydrous chromic oxide formed by ammonia precipitation from a trivalent chromium salt solution and subjected to heat treatment substantially in the range of 300–400° C. for not less than about two hours; discharging said reaction product from said zone, and separately recovering $CF_3COCF_2Cl$ and $CF_3COCF_3$.

9. The processes of claim 8 in which contact time of reactants and catalyst is substantially in the range of 6–25 seconds, and the catalyst is utilized in unsupported but sized form.

References Cited by the Examiner
UNITED STATES PATENTS

| | | | |
|---|---|---|---|
| 2,436,143 | 2/1948 | Hoehn | 260—653.7 |
| 2,807,646 | 9/1957 | Miller et al. | 260—595.5 |

OTHER REFERENCES

Remy: Treatise on Inorganic Chemistry, vol. II, p. 135–6 (1956).

LEON ZITVER, *Primary Examiner.*

LORRAINE A. WEINBERGER, *Examiner.*

W. B. LONE, *Assistant Examiner.*